United States Patent
Choi et al.

(10) Patent No.: US 11,478,921 B2
(45) Date of Patent: Oct. 25, 2022

(54) SPHERICAL ROBOT INCLUDING RING MEMBER

(71) Applicant: Samsung Electronics Co., Ltd., Gyeonggi-do (KR)

(72) Inventors: Jaewoong Choi, Gyeonggi-do (KR); Byunghun Cho, Gyeonggi-do (KR); Byounguk Yoon, Gyeonggi-do (KR); Kihuk Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 327 days.

(21) Appl. No.: 16/838,152

(22) Filed: Apr. 2, 2020

(65) Prior Publication Data

US 2020/0316771 A1    Oct. 8, 2020

(30) Foreign Application Priority Data

Apr. 4, 2019    (KR) .................. 10-2019-0039820

(51) Int. Cl.
| | |
|---|---|
| *G01C 19/02* | (2006.01) |
| *B25J 9/00* | (2006.01) |
| *B25J 9/12* | (2006.01) |
| *B25J 5/00* | (2006.01) |

(52) U.S. Cl.
CPC ............. *B25J 9/0009* (2013.01); *B25J 5/007* (2013.01); *B25J 9/12* (2013.01)

(58) Field of Classification Search
CPC .......... B64G 1/286; B64G 1/285; B64G 1/28; G01C 19/02; A63H 33/005
See application file for complete search history.

(56) References Cited

U.S. PATENT DOCUMENTS

| | | | |
|---|---|---|---|
| 9,893,574 B2 | 2/2018 | Bandera | |
| 9,968,864 B2 * | 5/2018 | Clarke | ................ G05D 1/0225 |
| D832,326 S * | 10/2018 | Lee | .............................. D21/578 |
| 10,101,739 B2 | 10/2018 | Clarke et al. | |
| 10,326,348 B2 | 6/2019 | Bandera et al. | |
| 10,399,620 B2 | 9/2019 | Zhang et al. | |
| 2014/0158445 A1 | 6/2014 | Welker | |
| 2015/0349396 A1 | 12/2015 | Aead | |
| 2016/0318608 A1 | 11/2016 | Himmelmann | |
| 2017/0001619 A1 | 1/2017 | Welker | |
| 2017/0012482 A1 * | 1/2017 | Bandera | ................... H02K 3/28 |
| 2017/0012492 A1 | 1/2017 | Bandera | |
| 2017/0162927 A1 | 6/2017 | Aead | |
| 2017/0266576 A1 | 9/2017 | Clarke et al. | |

(Continued)

FOREIGN PATENT DOCUMENTS

| | | | | |
|---|---|---|---|---|
| CN | 109015667 A | | 12/2018 | |
| GB | 2458905 A | * | 10/2009 | ............. G03B 17/02 |

(Continued)

OTHER PUBLICATIONS

International Search Report dated Jul. 17, 2020.

*Primary Examiner* — Randell J Krug
(74) *Attorney, Agent, or Firm* — Cha & Reiter, LLC (57) ABSTRACT

Disclosed is a spherical robot may include a body having a substantially spherical shape; and a ring member having a ring shape, the ring member being coupled to the body so as to be rotated about the body, wherein the ring member includes an inner surface configured to face a surface of the body and an outer surface opposite to the inner surface.

19 Claims, 9 Drawing Sheets

(56) References Cited

U.S. PATENT DOCUMENTS

| | | | |
|---|---|---|---|
| 2017/0266577 A1 | 9/2017 | Clarke et al. | |
| 2017/0269589 A1 | 9/2017 | Clarke et al. | |
| 2017/0297550 A1 | 10/2017 | Feng et al. | |
| 2018/0288334 A1* | 10/2018 | Zhang | B62D 57/02 |
| 2019/0186915 A1* | 6/2019 | Wiencrot | G01C 19/5726 |

FOREIGN PATENT DOCUMENTS

| | | | |
|---|---|---|---|
| JP | 2018535840 A * | 12/2018 | |
| KR | 10-1180872 B1 | 9/2012 | |
| WO | WO-2017208948 A1 * | 12/2017 | A63H 11/00 |

* cited by examiner

SPHERICAL ROBOT INCLUDING RING MEMBER

CROSS-REFERENCE TO RELATED APPLICATION(S)

This application is based on and claims priority under 35 U.S.C. § 119 to Korean Patent Application No. 10-2019-0039820, filed on Apr. 4, 2019, in the Korean Intellectual Property Office, the disclosure of which is incorporated by reference herein its entirety.

BACKGROUND

1. Field

The disclosure relates to a spherical robot including a ring member.

2. Description of Related Art

In general, a robot may travel using wheels or caterpillar tracks. However, the wheels requires a smooth ground and even a relatively small obstacle can interfere with the wheels. Caterpillar tracks requires costly maintenance due to a large number of components.

The above information is presented as background information only to assist with an understanding of the disclosure. No determination has been made, and no assertion is made, as to whether any of the above might be applicable as prior art with regard to the disclosure.

SUMMARY

In certain embodiments, a spherical robot may include a body having a substantially spherical shape; and a ring member having a ring shape, the ring member being coupled to the body so as to be rotated about the body, wherein the ring member includes an inner surface configured to face a surface of the body and an outer surface opposite to the inner surface.

In certain embodiments, a robot comprises a housing having a substantially spherical shape, the housing being configured to roll on the ground and a ring member configured to surround at least part of the housing and rotate about a center point of the housing, wherein the ring member includes an inner surface configured to face a surface of the housing, an outer surface opposite to the inner surface and connected to the inner surface to form an interior space, a sidewall configured to seal the interior space as a first space adjacent to the outer surface and a second space adjacent to the inner surface, a compressor formed on the sidewall and configured to supply compressed air into the second space, and at least one outlet formed through the inner surface from the second space.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

With regard to the description of the drawings, identical or similar reference numerals may be used to refer to identical or similar components.

DETAILED DESCRIPTION

A spherical robot can include a body having a substantially spherical shape. The spherical robot may travel while the spherical body itself rolls. The spherical robot may include wheels therein to roll the body.

A robot according to embodiments of the disclosure may include a body that performs rolling motion on the ground and a ring member coupled to the body so as to be rotatable about the body. When the body or the ring member is driven, surface friction may occur.

Aspects of the disclosure may address at least the surface friction and man provide at least the advantages described below. Accordingly, an aspect of the disclosure may provide a robot including a spacing structure for maintaining a predetermined interval between a body that performs rolling motion and a ring member that rotates about the body.

Hereinafter, certain embodiments of the disclosure will be described with reference to the accompanying drawings. However, those of ordinary skill in the art will recognize that modification, equivalent, and/or alternative on the certain embodiments described herein can be variously made without departing from the scope and spirit of the disclosure.

Figure 1:
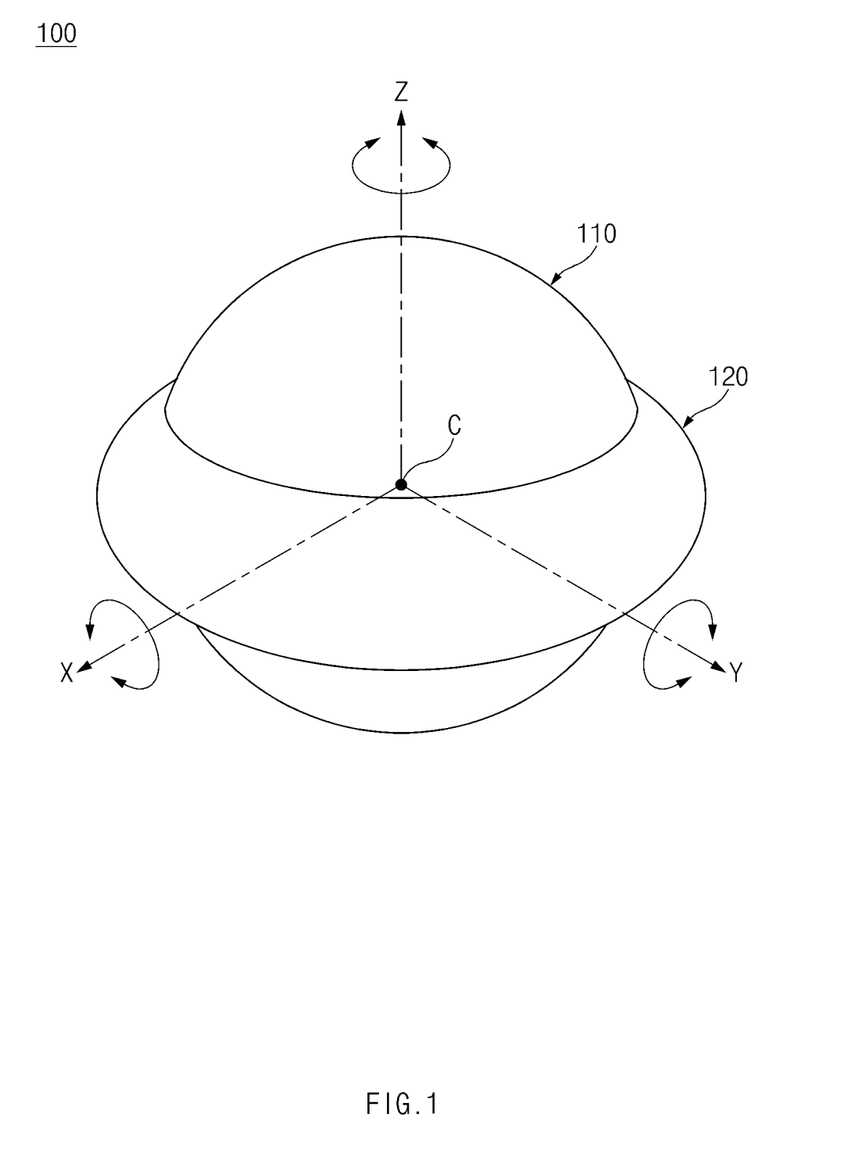
FIG. 1 is a view illustrating a spherical robot according to an embodiment.

FIG. 1 is a view illustrating a spherical robot 100 according to an embodiment.

In the illustrated embodiment, the spherical robot 100 may include a body 110 and a ring member 120 that has a ring shape and that is coupled to the body 110. The body 110 may have a substantially spherical shape. In certain embodiments, the body 110 may have a surface points that are within 10% deviation of a radius from the center point C. The body 110 may perform rotary motion about various axes passing through the center point C of the body 110.

In certain embodiments, surface friction by rotation of the ring member 120 about the body 110 is reduced if not eliminated by application of a separating force by the ring member 120 against the body 110. In certain members the separating force can separate the ring remember 120 by a certain interval from the body 110. In certain embodiments, the ring member 120 may release compressed air from an inner surface of the ring member 120 towards the body, thereby applying a separating force and/or separating the ring member 120 from the body by the certain interval.

In certain embodiments, the body 110 may perform rolling motion on the ground. The rolling motion may be a type of motion that combines rotary motion and translational motion. For example, the body 110 may perform rolling motion that includes rotary motion in which the body 110 rotates about any axes (e.g., the x axis, the y axis, and the z axis) that pass through the center point C of the body 110 and translational motion in which the center point C of the body 110 moves.

In certain embodiments, the ring member 120 may be formed in a ring shape coupled to the body 110 such that the body 110 is inserted into the ring member 120. The ring member 120 may be coupled to the body 110 so as to be rotatable. The ring member 120 may perform rotary motion about any axes (e.g., the x axis, the y axis, and the z axis) that pass through the center point C of the body 110.

Figure 2A:
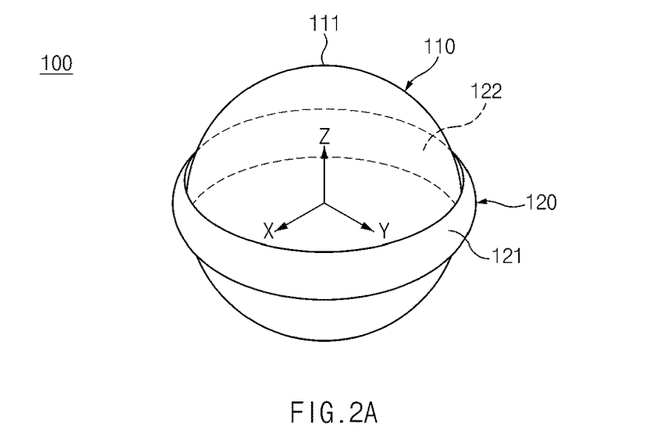
FIGS. 2A to 2C are views illustrating driving of a ring member of the spherical robot according to an embodiment.
Figure 2B:
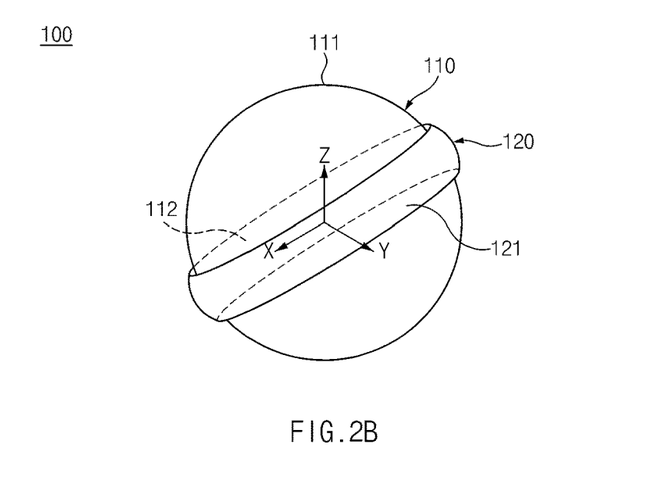
Figure 2C:
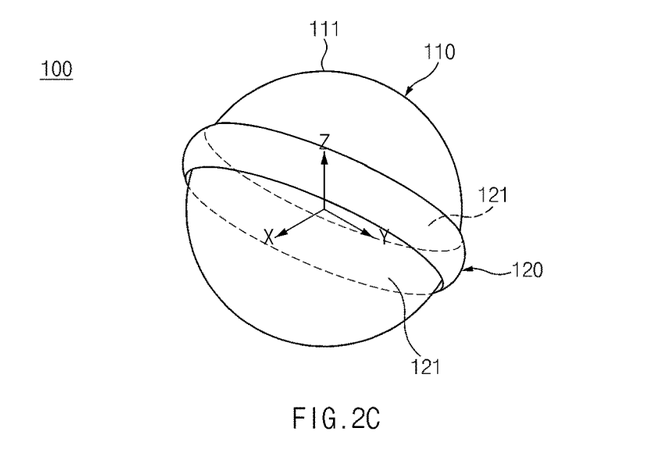

FIGS. 2A to 2C are views illustrating driving of the ring member 120 of the spherical robot 100 according to an embodiment.

Here, the origin of the coordinate system may refer to the center point of the body 110. That is, FIGS. 2A to 2C mean cases where only the ring member 120 is driven in the state in which the body 110 is not driven.

Referring to FIGS. 2A to 2C, the ring member 120 may include an inner surface 122 that faces a surface 111 of the body 110 and an outer surface 121 that is opposite to the inner surface 122 and that forms the exterior of the spherical robot 100.

In the illustrated embodiment, the ring member 120 may be rotated about the center point of the body 110 in various directions.

In the illustrated embodiment, the ring member 120 may rotate about any axis (e.g., the x-axis, the y-axis, or the z-axis) that passes through the center point of the body 110. For example, the ring member 120 illustrated in FIG. 2B may correspond to the state in which the ring member 120 illustrated in FIG. 2A is rotated about the x-axis. For example, the ring member 120 illustrated in FIG. 2C may correspond to the state in which the ring member 120 illustrated in FIG. 2A is rotated about the y-axis. Furthermore, the ring member 120, for example, may rotate about the z-axis in the state illustrated in FIG. 2A.

In certain embodiments, surface friction due to rotation of the ringer member 120 about an axis is reduced if not eliminated by application of a separation force by the ring member 120 against the body 110.

Figure 3:
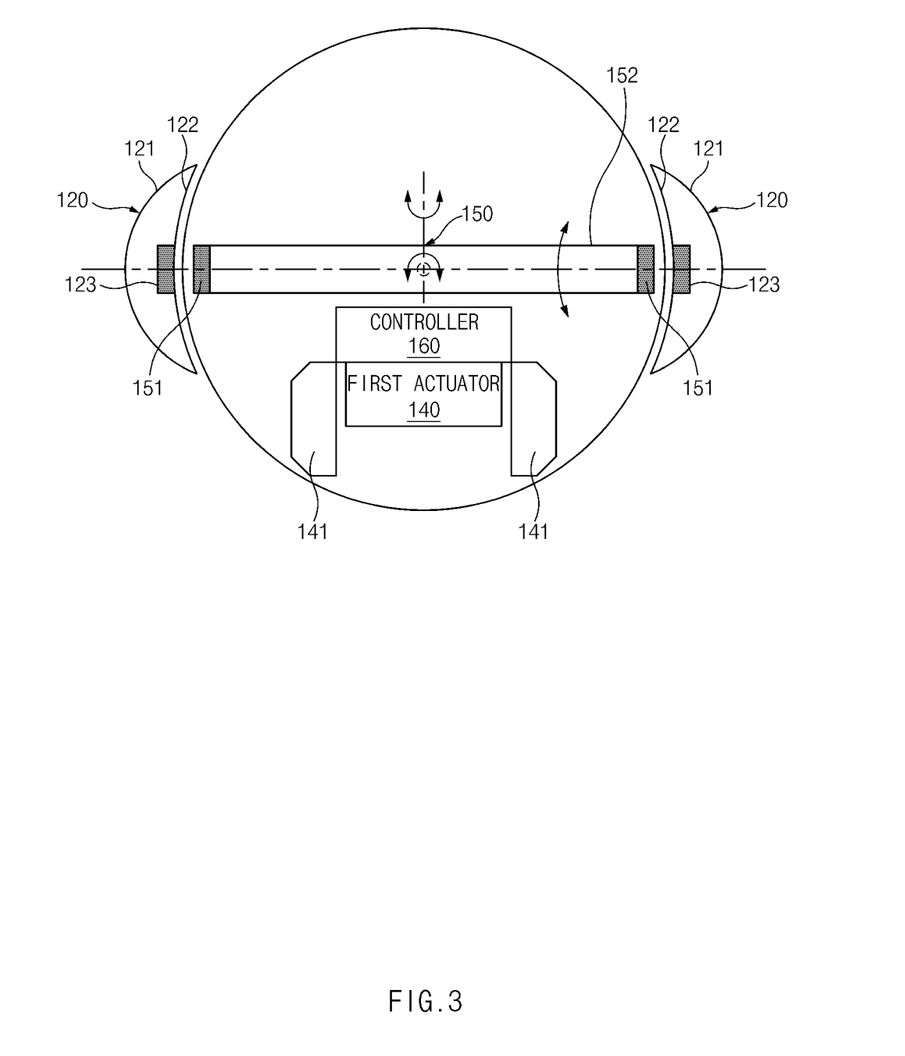
FIG. 3 is a view illustrating the inside of a body of the spherical robot according to an embodiment.

FIG. 3 is a view illustrating the inside of the body 110 of the spherical robot 100 according to an embodiment.

In the illustrated embodiment, the spherical robot 100 may include a first actuator 140 for driving the body 110, a second actuator 150 for driving the ring member 120, and a controller 160 for controlling the first actuator 140 and the second actuator 150. The first actuator 140, the second actuator 150, and the controller 160 may be disposed in the body 110.

In certain embodiments, the first actuator 140 may include inner wheels 141 disposed in the body 110. The inner wheels 141 may be disposed in the body 110 so as to make contact with an inner surface of the body 110 and rotate relative to the inner surface of the body 110.

In certain embodiments, the first actuator 140 may include one or more motors. The first actuator 140 may drive the one or more motors to allow the body 110 to rotate and move in place.

In certain embodiments, the second actuator 150 may include a guide member 152 that has at least one rotational degree of freedom and that guides driving of the ring member 120. For example, the guide member 152 may be formed in a ring shape included in the inside of the body 110. The guide member 152 may include a first magnet 151. The first magnet 151 may form an attraction force with a second magnet 123 included in the ring member 120. The guide member 152 may have at least one rotational degree of freedom. Accordingly, the ring member 120 may be driven by an interaction between the first magnet 151 and the second magnet 123 to correspond to driving of the guide member 152.

In certain embodiments, the body 110 may perform rolling motion on the ground, and the ring member 120 may perform rotary motion relative to the body 110 and the ground. The rolling motion and the rotary motion may be independently controlled.

In certain embodiments, the first actuator 140 and the second actuator 150 may be independently or partially independently driven by the controller 160.

Meanwhile, the inside of the body 110 illustrated in FIG. 3 is merely illustrative, and the spherical robot 100 disclosed herein may include various internal structures capable of rolling the spherical body 110 and rotating the ring member 120.

In certain embodiments, friction between the ring member 120 and the body 110 can be reduced if not eliminated by maintaining a distance between the inner surface 122 of the ring member 120 and the surface 111 of the body 110. The distance can be maintained by air pressure applied by the ring member 120 against the body 110, and the magnetic forces of magnets 151, 123. The controller 160 can control the force of the air pressure by controlling a compressor in the ring member 120 (see FIG. 5, compressor 134).

In certain embodiments, the ring member 120 may apply a separating force against the body 110 while being attached to the body. The separating force reduces the friction caused by movement of the inner surface 122 of the ring member 120 against the surface 111 of the body.

In certain embodiments, the ring member 120 and/or the body 110 may include a sensor that senses the interval between the ring member 120 and the body 110. The sensor may include a proximity sensor, a Hall sensor, and an electromagnetic sensor.

For example, the controller 160 may be configured to detect the interval between the body 110 and the ring member 120 based on information sensed by the sensor.

In some embodiments, the ring member 120 may further include an auxiliary rolling member. The auxiliary rolling member may provide rolling contact to the surface 111 of the body 110 in the case where the ring member 120 is close to the body 110.

For example, in the case where the ring member 120 is close to the body 110 (e.g., discharge pressure is decreased), the surface 111 of the body 110 may make surface-to-surface contact with the inner surface 122 of the ring member 120, which causes damage to the surface 111 of the body 110. At this time, the auxiliary rolling member included in the ring member 120 may provide rolling contact (e.g., point contact) with the surface 111 of the body 110, thereby reducing damage to the surface 111 of the body 110.

In certain embodiments, the auxiliary rolling member may include a ball caster. The auxiliary rolling member may further include a sensor (e.g., a probe or a pogo pin) that senses contact with the body 110.

In certain embodiments, the controller 160 may detect whether the auxiliary rolling member makes contact with the body 110, and when it is detected that auxiliary rolling member makes contact with the body 110, the controller 160 may increase the air pressure from the ring member 120 to maintain the interval between the body 110 and the ring member 120 in a specified non-zero range.

In certain embodiments, the controller 160 may detect the direction of an external force applied to the ring member 120 and may control the air pressure based on the direction of the external force. For example, in the case where an external force is mainly applied in the direction of the central axis of the ring member 120, the controller 160 may discontinue the air pressure. For example, in the case where an external force is applied to the ring member 120 in a direction orthogonal to the central axis thereof (e.g., in the radial direction from the center point), the controller 160 may increase air pressure that corresponds to the part to which the external force is applied.

Figure 4:
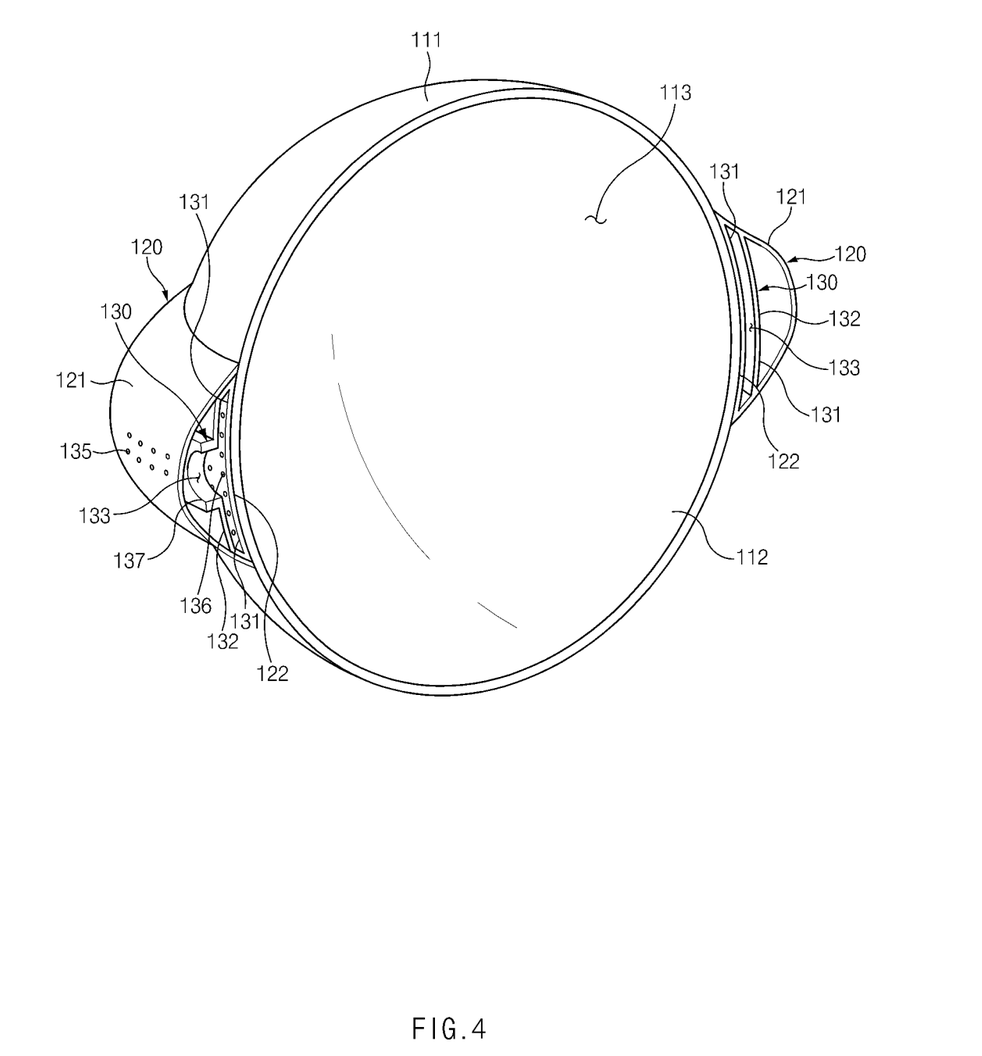
FIG. 4 is a sectional perspective view of the spherical robot 100 according to certain embodiments.

FIG. 4 is a sectional perspective view of the spherical robot 100 according to certain embodiments.

Referring to FIG. 4, the ring member 120 may include the inner surface 122 that faces the surface 111 of the body 110 and the outer surface 121 that is opposite to the inner surface 122.

In certain embodiments, the ring member 120 may include a chamber 130 therein. The chamber 130 may include a first sidewall 131 formed on the inner surface 122 of the ring member 120 and a second sidewall 132 that extends from the first sidewall 131 and that is formed between the first sidewall 1331 and the outer surface 121 of the ring member 120. A chamber space 133 may be formed between the first sidewall 131 and the second sidewall 132. Compressed air may be received in the chamber space 133. The chamber space 133 may be sealed from another space of the ring member 120 (e.g., the space between the second sidewall 132 and the outer surface 121 of the ring member 120). In some embodiments, the chamber 130 may include a sidewall (e.g., the second sidewall 132) and a portion of the inner surface 122 of the ring member 120. That is, the first sidewall 131 may be omitted, and the portion of the inner surface 122 of the ring member 120 may form the chamber space 133 together with the second sidewall 132.

In the illustrated embodiment, a plurality of inlets 135 may be formed in the outer surface 121 of the ring member 120. Air outside the ring member 120 may be introduced into the ring member 120 through the inlets 135. The outside air may flow into an outlet 136 through an opening 137 formed in the second sidewall 132. In some embodiments, a compressor (see FIG. 5, compressor 134) may be disposed in the opening 137, and the outside air may be introduced into the ring member 120 by pressure formed by the compressor 134.

In the illustrated embodiment, the first sidewall 131 may have the opening 137 through which the outside air is introduced into the chamber space 133. The compressor 134 for compressing the outside air may be disposed in the opening 137. The compressor 134 may form pressure to allow air outside the ring member 120 to flow into the ring member 120. Compressed air may be received in the chamber space 133. The first sidewall 131 may have the outlet 136 through which the compressed air in the chamber space 133 is dispensed. A plurality of outlets 136 may be formed. The outlets 136 may be formed to face toward the surface 111 of the body 110 and may be formed through the first sidewall 131 and a portion of the inner surface 122 of the ring member 120 that faces the first sidewall 131.

Figure 5:
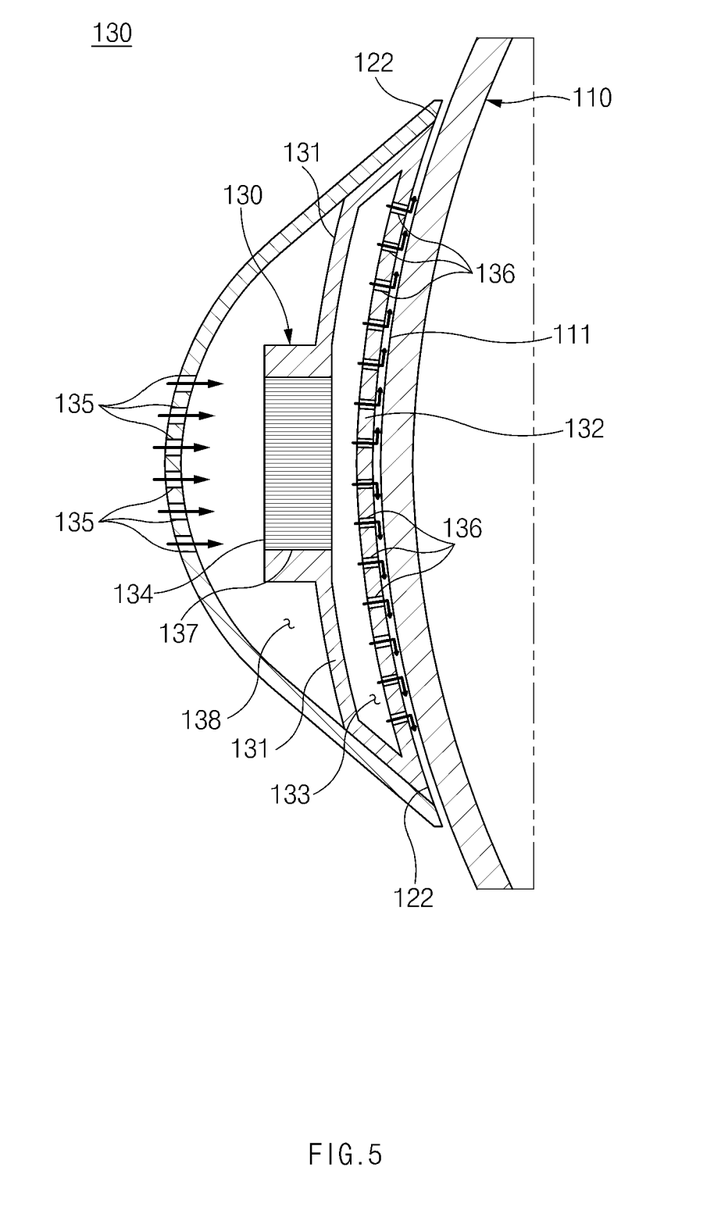
FIG. 5 is a sectional view of a chamber of the spherical robot according to certain embodiments.

FIG. 5 is a sectional view of the chamber of the spherical robot according to certain embodiments.

Referring to FIG. 5, the plurality of outlets 136 may be formed in the first sidewall 131. The opening 137 in which the compressor 134 is disposed may be formed in the second sidewall 132. Air compressed by the compressor 134 may be received in the chamber space 133 between the first sidewall 131 and the second sidewall 132. The plurality of inlets 135 may be formed in the outer surface 121 of the ring member 120.

In certain embodiments, the ring member 120 may include the chamber space 133 and an interior space 138 therein. The chamber space 133 may be formed by the first sidewall 131 and the second sidewall 132, and the interior space 138 may be formed by the second sidewall 132 and the outer surface 121 of the ring member 120.

Referring to arrows illustrated in FIG. 5, the inlets 135, the compressor 134, the chamber space 133, and the outlets 136 may form an air flow path.

In the illustrated embodiment, air outside the ring member 120 may be introduced into the interior space 138 through the inlets 135. The outside air introduced into the interior space 138 may be compressed by the compressor 134 and may be introduced into the chamber space 133. The compressed air may be dispensed onto the surface 111 of the body 110 through the outlets 136.

In certain embodiments, air outside the spherical robot 100 may be introduced into the interior space 138 of the ring member 120 through the inlets 135 formed in the outer surface 121 of the ring member 120, the air received in the interior space 138 may be compressed by the compressor 134, and the compressed air may be received in the chamber space 133. The compressed air in the chamber space 133 may be dispensed toward the surface 111 of the body 110 through the outlets 136. The air dispensed through the outlets 136 may apply air pressure to the surface 111 of the body 110. Accordingly, the ring member 120 may be disposed such that the inner surface 122 of the ring member 120 is spaced apart from the surface 111 of the body 110 at a certain interval.

In certain embodiments, the plurality of inlets 135 and the plurality of outlets 136 may be formed. The sum of areas of the plurality of inlets 135 may be greater than the sum of areas of the plurality of outlets 136. Because the flow rate at which air is introduced into the inlets 135 is equal to the flow rate at which air is dispensed through the outlets 136, the outflow speed may be higher than the inflow speed.

Figure 6A:
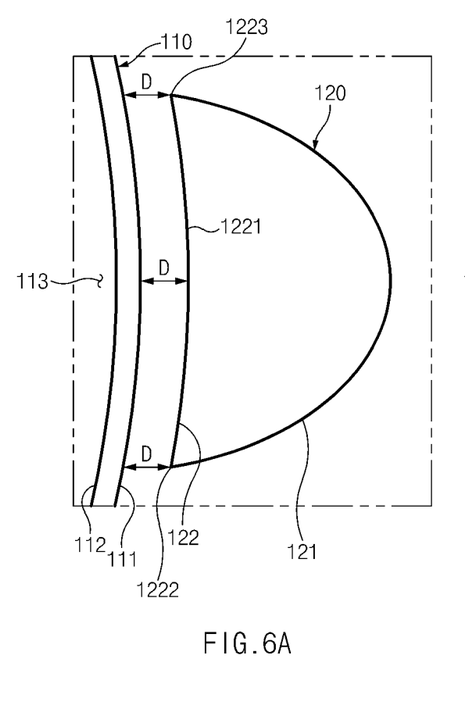
FIGS. 6A and 6B are views illustrating the body and the ring member of the spherical robot according to certain embodiments.
Figure 6B:
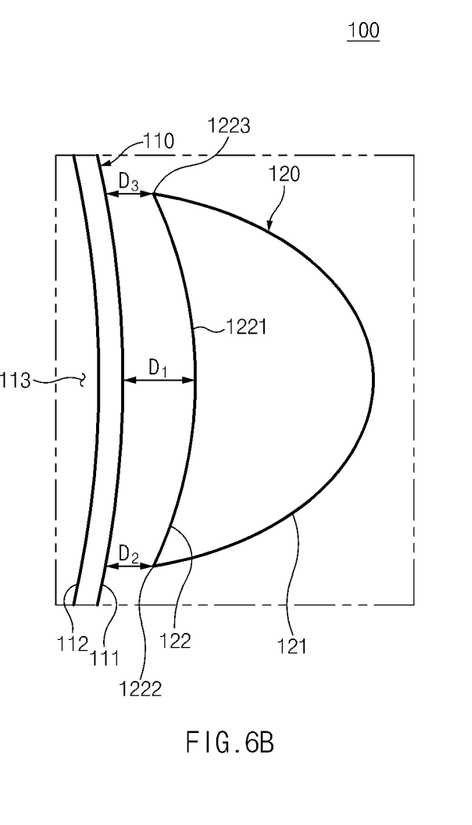

FIGS. 6A and 6B are views illustrating the body and the ring member of the spherical robot according to certain embodiments.

In the illustrated embodiment, the body 110 and the ring member 120 may be disposed such that the surface 111 of the body 110 and the inner surface 122 of the ring member 120 face each other. The body 110 and the ring member 120 may be disposed such that the surface 111 of the body 110 and the inner surface 122 of the ring member 120 are spaced apart from each other at a certain interval.

In the illustrated embodiment, the ring member 120 may include the outer surface 121 and the inner surface 122 extending from the outer surface 121. The interior space 138 may be formed between the outer surface 121 and the inner surface 122. The outer surface 121 may form the exterior of the spherical robot 100. The inner surface 122 of the ring member 120 may include edge regions 1222 and 1223 adjacent to the outer surface 121 and a central region 1221 formed between the edge regions 1222 and 1223.

In the illustrated embodiment, the inner surface 122 and the outer surface 121 of the ring member 120 may be formed to be curved surfaces having certain curvatures.

For example, referring to FIG. 6A, the inner surface 122 of the ring member 120 may be formed to be a curved surface having substantially the same curvature as the surface 111 of the body 110. The surface 111 of the body 110 and the inner surface 122 of the ring member 120 may be spaced apart from each other at the same interval. In the illustrated embodiment, the first edge region 1222, the second edge region 1223, and the central region 1221 may be spaced apart from the surface 111 of the body 110 at a predetermined and substantially constant, interval D. In certain embodiments, the distance between the points on inner surface 122 and the surface of the body 111 may have less than 5% deviation from D.

For example, referring to FIG. 6B, the inner surface 122 of the ring member 120 may be formed to be a curved surface having a larger curvature than the surface 111 of the body 110. The edge regions 1222 and 1223 and the central region 1221 of the inner surface 122 may be spaced apart from the surface 111 of the body 110 at different intervals.

Referring to FIG. 6B, the central region 1221 of the inner surface 122 may be spaced apart from the body 110 at a first interval D1, the first edge region 1222 of the inner surface 122 may be spaced apart from the body 110 at a second interval D2 smaller than the first interval D1, and the second edge region 1223 of the inner surface 122 may be spaced apart from the body 110 at a third interval D3 smaller than the first interval D1.

In some embodiments, the intervals D2 and D3 that the first edge region 1222 and the second edge region 1223 form with the outer surface 121 may be substantially the same as each other, or within 5% deviation. This structure may maximize an effect of levitating the ring member 120 relative to the surface 111 of the body 110 when the flow rate of compressed air dispensed is constant.

Figure 7:
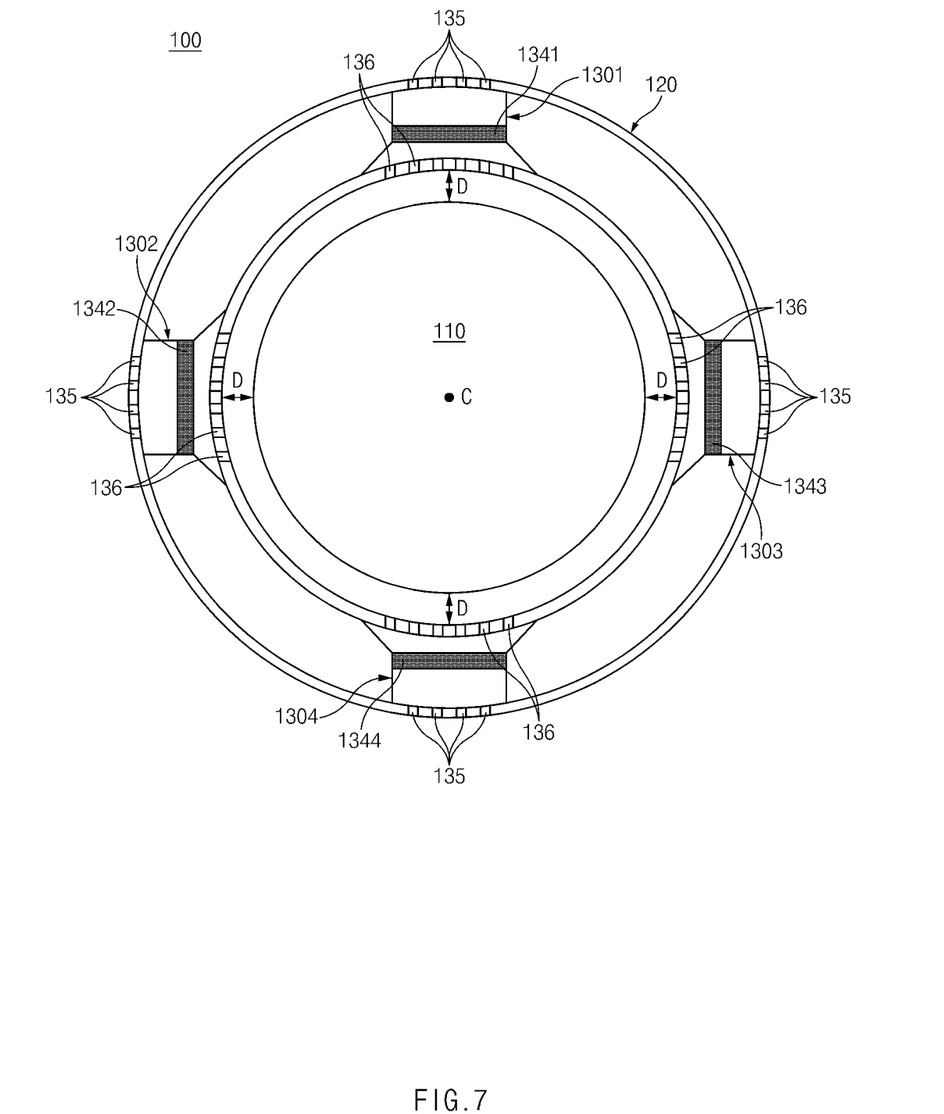
FIG. 7 is a view illustrating a plurality of chambers 130 of the spherical robot 100 according to certain embodiments.

FIG. 7 is a view illustrating a plurality of chambers 130 of the spherical robot 100 according to certain embodiments.

Referring to FIG. 7, the spherical robot 100 according to certain embodiments may include a plurality of chambers 1301, 1302, 1303, and 1304 disposed in the ring member 120 and a plurality of compressors 1341, 1342, 1343, and 1344 coupled to the plurality of chambers 1301, 1302, 1303, and 1304, respectively. The plurality of chambers 1301, 1302, 1303, and 1304 may be disposed to form a certain angle therebetween with respect to the center point C of the body 110.

For example, referring to FIG. 7, the plurality of chambers may include the first chamber 1301, the second chamber 1302, the third chamber 1303, and the fourth chamber 1304, and any one of the chambers may be disposed to form an angle of approximately, 90 degrees, or between 88-92 degrees, with chambers adjacent thereto with respect to the center point C of the body 110.

Accordingly, compressed air dispensed from the chambers 1301, 1302, 1303, and 1304 may apply uniform pressure to the surface 111 of the body 110. The uniform pressure may space the ring member 120 apart from the body 110 at a predetermined interval.

In certain embodiments, the plurality of chambers 1301, 1302, 1303, and 1304 may each be spaced apart from chambers adjacent thereto at the same intervals.

For example, in the case where the ring member 120 includes three chambers 1301, 1302, and 1303, the chambers 1301, 1302, and 1303 may be disposed to form an angle of approximately 120 degrees, or between 118 and 122 degrees, therebetween with respect to the center point C of the body 110. In another example, in the case where the ring member 120 includes two chambers 1301 and 1302, the chambers 1301 and 1302 may be disposed to form an angle of approximately 180 degrees, or between 178 and 182 degrees, therebetween with respect to the center point C of the body 110.

In the case where the ring member 120 includes N chambers, the chambers may be disposed to form an angle of approximately 360/N, or between 360/N−2 to 360/N+2, therebetween with respect to the center point C of the body 110.

Figure 8:
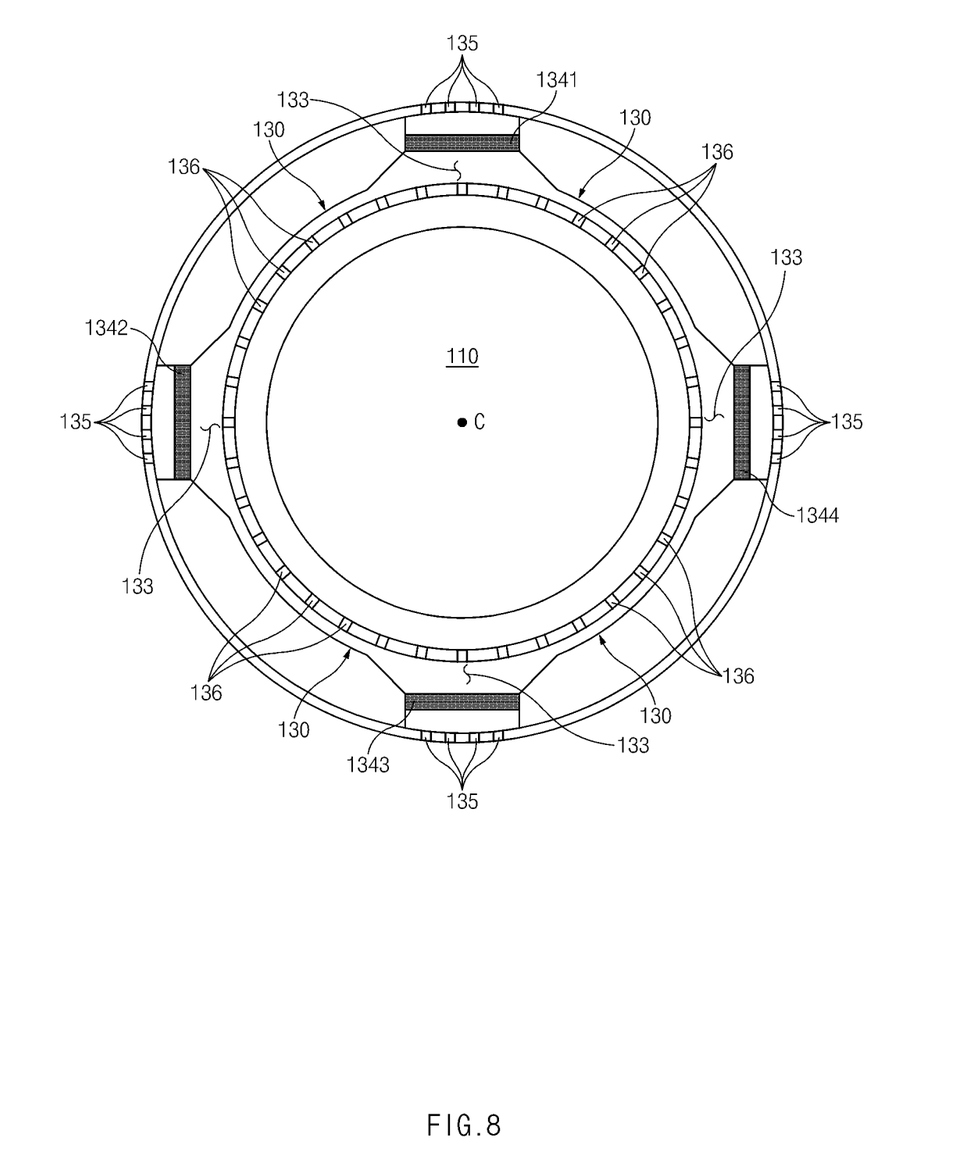
FIG. 8 is a view illustrating a chamber 130 of the spherical robot 100 according to certain embodiments.

FIG. 8 is a view illustrating a chamber 130 of the spherical robot 100 according to certain embodiments.

Referring to FIG. 8, the spherical robot 100 according to certain embodiments may include one chamber 130 disposed in the ring member 120 and a plurality of compressors 1341, 1342, 1343, and 1344 coupled to the chamber 130.

In the illustrated embodiment, the one chamber 130 may include openings in which the plurality of compressors 1341, 1342, 1343, and 1344 are disposed, respectively. Preferably, the plurality of compressors 1341, 1342, 1343, and 1344 may each be spaced apart from compressors adjacent thereto at the same intervals. The plurality of compressors 1341, 1342, 1343, and 1344 may supply compressed air into one chamber space 133.

In the illustrated embodiment, the compressed air, which is compressed by the compressors 1341, 1342, 1343, and 1344, may be received in the chamber 130, and the chamber 130 may include a plurality of outlets 136 formed toward the body 110 such that the compressed air received is dispensed toward the body 110. The outlets 136 may be formed through the inner surface 122 of the ring member 120.

In the illustrated embodiment, the ring member 120 may include the four compressors 1341, 1342, 1343, and 1344, and any one of the compressors may be disposed to form an angle of approximately 90 degrees, or between 88 and 92 degrees with compressors adjacent thereto with respect to the center point C of the body 110.

For example, in the case where the ring member 120 includes three compressors 1341, 1342, and 1343, the compressors 1341, 1342, and 1343 may be disposed to form an angle of approximately 120 degrees, or between 118 and 122 degrees, therebetween with respect to the center point C of the body 110. In another example, in the case where the ring member 120 includes two compressors 1341 and 1342, the compressors 1341 and 1342 may be disposed to form an angle of approximately 180 degrees, or between 178 and 182 degrees, therebetween with respect to the center point C of the body 110.

In the case where the ring member 120 includes N chambers, the chambers may be disposed to form an angle of approximately 360/N, or between 360/N−2 to 360/N+2, therebetween with respect to the center point C of the body 110.

In the illustrated embodiment, the ring member 120 may include a plurality of inlets 135 formed in the outer surface 121 thereof. In certain embodiments, the plurality of inlets 135 may be formed in areas corresponding to the compressors 1341, 1342, 1343, and 1344.

Unlike the ring member 120 illustrated in FIG. 7, the ring member 120 illustrated in FIG. 8 may include the plurality of outlets 136 formed along the periphery of the ring member 120 at predetermined intervals. Accordingly, compressed air dispensed through the outlets 136 may apply uniform pressure to the surface 111 of the body 110. The uniform pressure may maintain the ring member 120 and the body 110 such that the ring member 120 and the body 110 are spaced apart from each other at a predetermined interval.

Figure 9:
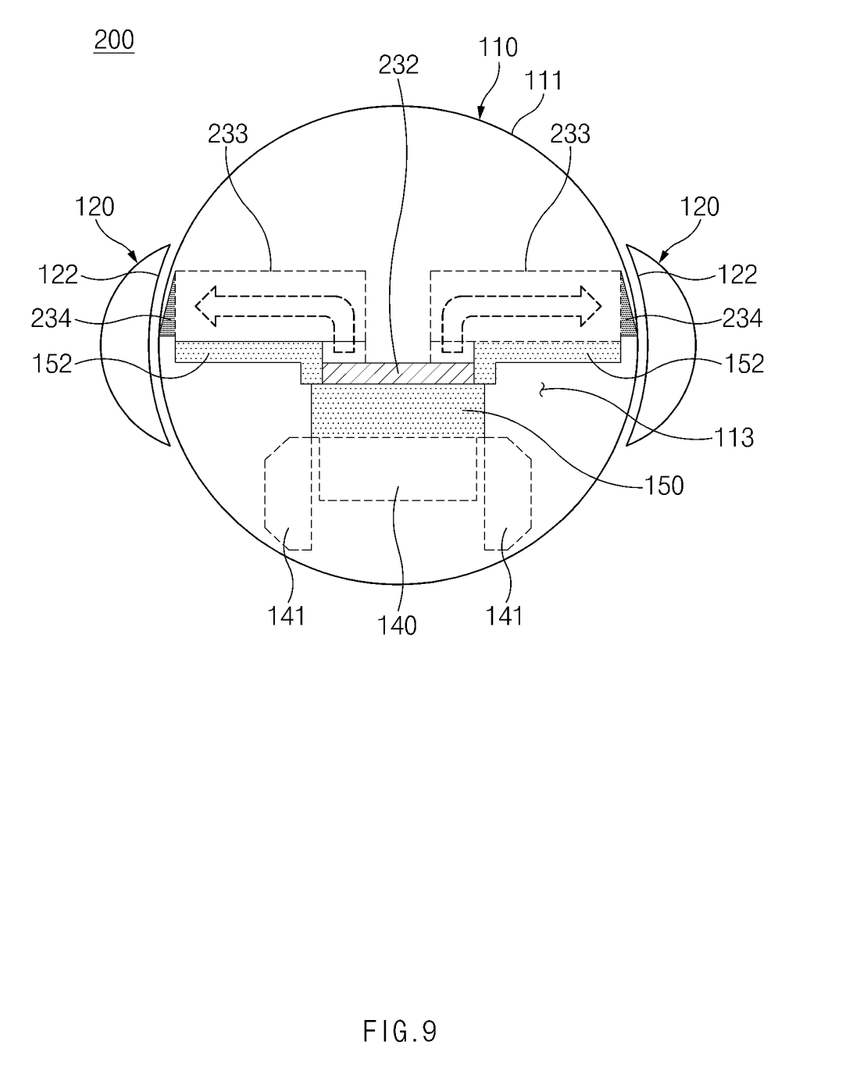
FIG. 9 is a view illustrating the inside of a body 110 of a spherical robot 200 according to certain embodiments.

FIG. 9 is a view illustrating the inside of a body 110 of a spherical robot 200 according to certain embodiments.

Referring to FIG. 9, the body 110 may include inner wheels 141, a first actuator 140, a compressor 232, and ducts 233 therein. The first actuator 140 may drive the inner wheels 141, the compressor 232 may compress air, and the ducts 233 may extend from the compressor 232 to a surface 111 of the body 110. The inner wheels 141 and the first actuator 140 may be referred to as the inner wheels 141 and the first actuator 140 described above with reference to FIG. 2.

In certain embodiments, the body 110 may be formed of a porous material such that outside air is introduced into the body 110. Alternatively, the body 110 may include one or more inlets through which outside air is introduced into a hollow 113.

In certain embodiments, the compressor 232 may compress air in the body 110 and may release the compressed air toward an inner surface 122 of a ring member 120 through the ducts 233. The inner surface 122 of the ring member 120 may remain spaced apart from the surface 111 of the body 110 at a certain interval by the compressed air dispensed. The ducts 233 may each further include, on an end portion thereof, a sealing member 234 for sealing the compressed air.

In certain embodiments, the spherical robot 200 may include a second actuator 150 for driving the ring member 120.

In certain embodiments, the ring member 120 may be rotated outside the body 110 as the second actuator 150 in the body 110 rotates.

In certain embodiments, the compressor 232 and the ducts 233 may be disposed on the second actuator 150 so as to be driven together with the ring member 120. In other words, the ring member 120 may be rotated outside the body 110, and the compressor 232 and the ducts 233, together with the second actuator 150, may be driven in the body 110 to correspond to driving of the ring member 120. For example, the second actuator 150 may include a guide member 152 (e.g., the guide member 152 of FIG. 3) that rotates along an inner surface of the body 110. An outer surface of the guide member 152 may be formed to be a curved surface having a curvature corresponding to the curvature of the inner surface of the body 110. The guide member 152 may be formed in a ring shape. The compressor 232 and/or the ducts 233 may be coupled to the guide member 152 so as to rotate together with the guide member 152.

In certain embodiments, a spherical robot may include a body having a substantially spherical shape; and a ring member having a ring shape, the ring member being coupled to the body so as to be rotated about the body, wherein the ring member includes an inner surface configured to face a surface of the body and an outer surface opposite to the inner surface.

In certain embodiments, the ring member is configured to be positioned such that the inner surface is spaced apart from the surface of the body at a certain interval.

In certain embodiments, the ring member includes a compressor and a chamber therein, the compressor being configured to compress air and the chamber being configured to receive the compressed air that is compressed by the compressor, and the ring member is configured to release the compress air from the chamber towards the surface of the body causing inner surface to be spaced apart from the surface of the body at a certain interval.

In certain embodiments, the chamber includes at least one outlet extending to the inner surface of the ring member and at least one inlet extending from the outer surface, and the compressor is configured to suction air, and the at least one inlet is configured to receive the suctioned air.

In certain embodiments, the at least one outlet includes a plurality of outlets formed along the inner surface of the ring member.

In certain embodiments, an area of the at least one outlet is smaller than an area of the at least one inlet.

In certain embodiments, the ring member includes a plurality of chambers therein in which compressed air is received, and each of the plurality of chambers includes at least one outlet formed in the inner surface of the ring member configured to release the compressed air towards the surface of the body, and the plurality of chambers are spaced apart from each other at certain intervals along a circumferential direction with respect to a central axis of the body.

In certain embodiments, each of the plurality of chambers is spaced apart from chambers adjacent thereto at substantially the same intervals.

In certain embodiments, a first actuator is configured to drive the body such that the body rolls about a first axis passing through a center point of the body; and a second actuator is configured to drive the ring member such that the ring member rotates about a second axis passing through the center point of the body.

In certain embodiments, the first actuator and the second actuator are disposed in the body.

In certain embodiments, the second actuator includes at least two motors such that the ring member has at least two degrees of freedom.

In certain embodiments, the first actuator is disposed in the body, and the second actuator is disposed in the ring member.

In certain embodiment, the first actuator includes one or more wheels at least partially making contact with an inner surface of the body and one or more motors configured to rotate the one or more wheels.

In certain embodiments, the body includes a guide member and an actuator therein, wherein the guide member is configured to rotate along an inner circumferential surface of the body and includes a first magnet and the actuator rotates the guide member, the ring member includes a second magnet corresponding to the first magnet, the actuator is configured to rotate the guide member such that the ring member rotates about the body.

In certain embodiments, the body includes at least one outlet formed in the surface of the body, a compressor disposed in the body, and a duct extending from the compressor to the at least one outlet, and the compressor is configured to compress air and release the compressed air to the at least one outlet through the duct.

In certain embodiments, the inner surface of the ring member is formed to have a curvature corresponding to a curvature of the surface of the body.

In certain embodiments, the inner surface of the ring member includes a central region and an edge region formed at an edge of the central region, and the ring member is disposed such that the central region is spaced apart from the surface of the body at a first interval and the edge region is spaced apart from the surface of the body at a second interval smaller than the first interval.

In certain embodiments, a robot comprises a housing having a substantially spherical shape, the housing being configured to roll on the ground and a ring member configured to surround at least part of the housing and rotate about a center point of the housing, wherein the ring member includes an inner surface configured to face a surface of the housing, an outer surface opposite to the inner surface and connected to the inner surface to form an interior space, a sidewall configured to seal the interior space as a first space adjacent to the outer surface and a second space adjacent to the inner surface, a compressor formed on the sidewall and configured to supply compressed air into the second space, and at least one outlet formed through the inner surface from the second space.

In certain embodiments, the ring member is configured to space apart the inner surface from the surface of the housing at a certain interval by the compressed air dispensed through the outlet.

In certain embodiments, the surface of the housing includes a porous structure.

According to the embodiments of the disclosure, the ring member may be rotated in the state of being spaced apart from the surface of the body at a predetermined interval. Accordingly, friction and/or noise generated when the body and the ring member move relative to each other may be reduced. In addition, damage to the surface of the body depending on consistent driving may be prevented.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element. The term "coupled to" shall be understood to include making contact with, as well as proximate to and maintained by counteracting forces within a fixed distance or range of distances.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program) including one or more instructions that are stored in a storage medium (e.g., internal memory or external memory) that is readable by a machine (e.g., the electronic device). For example, a processor(e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:
1. A spherical robot comprising:
a body having a substantially spherical shape;
a ring member having a ring shape, the ring member being coupled to the body so as to be rotated about the body, wherein the ring member includes an inner surface configured to face a surface of the body and an outer surface opposite to the inner surface a first actuator configured to drive the body such that the body rolls about a first axis passing through a center point of the body; and a second actuator configured to drive the ring member such that the ring member rotates about a second axis passing through the center point of the body.

2. The spherical robot of claim 1, wherein the ring member is configured to be positioned such that the inner surface is spaced apart from the surface of the body at a certain interval.

3. The spherical robot of claim 1, wherein the first actuator and the second actuator are disposed in the body.

4. The spherical robot of claim 1, wherein the second actuator includes at least two motors such that the ring member has at least two degrees of freedom.

5. The spherical robot of claim 1, wherein the first actuator is disposed in the body, and wherein the second actuator is disposed in the ring member.

6. The spherical robot of claim 1, wherein the first actuator includes one or more wheels at least partially making contact with an inner surface of the body and one or more motors configured to rotate the one or more wheels.

7. The spherical robot of claim 1, wherein the second actuator includes a guide member disposed inside the body and configured to rotate along an inner circumferential surface of the body, wherein the guide member includes a first magnet, wherein the ring member includes a second magnet corresponding to the first magnet, and wherein the second actuator is configured to rotate the guide member such that the ring member rotates about the body.

8. The spherical robot of claim 1, wherein the body includes at least one outlet formed in the surface of the body, a compressor disposed in the body, and a duct extending from the compressor to the at least one outlet, and wherein the compressor is configured to compress air and release the compressed air to the at least one outlet through the duct.

9. The spherical robot of claim 1, wherein the inner surface of the ring member is formed to have a curvature corresponding to a curvature of the surface of the body.

10. The spherical robot of claim 1, wherein the inner surface of the ring member includes a central region and an edge region formed at an edge of the central region, and wherein the ring member is disposed such that the central region is spaced apart from the surface of the body at a first interval and the edge region is spaced apart from the surface of the body at a second interval smaller than the first interval.

11. The spherical robot of claim 1, wherein the ring member includes a plurality of chambers therein in which compressed air is received, wherein each of the plurality of chambers includes at least one outlet formed in the inner surface of the ring member configured to release the compressed air towards the surface of the body, and wherein the plurality of chambers are spaced apart from each other at certain intervals along a circumferential direction with respect to a central axis of the body.

12. The spherical robot of claim 11, wherein each of the plurality of chambers is spaced apart from chambers adjacent thereto at substantially the same intervals.

13. The spherical robot of claim 1, wherein the ring member includes a compressor and a chamber therein, the compressor being configured to compress air and the chamber being configured to receive the compressed air that is compressed by the compressor, and wherein the ring member is configured to release the compressed air from the chamber towards the surface of the body causing the inner surface to be spaced apart from the surface of the body at a certain interval.

14. The spherical robot of claim 13, wherein the chamber includes at least one outlet extending to the inner surface of the ring member and at least one inlet extending from the outer surface, wherein the compressor is configured to suction air, and the at least one inlet is configured to receive the suctioned air.

15. The spherical robot of claim 14, wherein the at least one outlet includes a plurality of outlets formed along the inner surface of the ring member.

16. The spherical robot of claim 14, wherein an area of the at least one outlet is smaller than an area of the at least one inlet.

17. A robot comprising:

a housing having a substantially spherical shape, the housing being configured to roll on the ground; and a ring member configured to surround at least part of the housing and rotate about a center point of the housing, wherein the ring member includes:

an inner surface configured to face a surface of the housing;

an outer surface opposite to the inner surface and connected to the inner surface to form an interior space;

a sidewall configured to seal the interior space as a first space adjacent to the outer surface and a second space adjacent to the inner surface;

a compressor formed on the sidewall and configured to supply compressed air into the second space; and at least one outlet formed through the inner surface from the second space.

18. The robot of claim 17, wherein the ring member is configured to space apart the inner surface from the surface of the housing at a certain interval by the compressed air dispensed through the at least one outlet.

19. The robot of claim 17, wherein the surface of the housing includes a porous structure.

* * * * *